US012734624B2

(12) United States Patent
Chang et al.

(10) Patent No.: US 12,734,624 B2
(45) Date of Patent: Sep. 15, 2026

(54) HOLDER PLATE FOR NEGATIVE PRESSURE CHUCKING, HOLDER DEVICE FOR NEGATIVE PRESSURE CHUCKING, AND DE-BONDING STATION

(71) Applicant: SKY TECH INC., Hsinchu County (TW)

(72) Inventors: Jung-Hua Chang, Hsinchu County (TW); Ching-Liang Yi, Hsinchu County (TW); Ta-Hao Kuo, Hsinchu County (TW)

(73) Assignee: SKY TECH INC., Hsinchu County (TW)

(*) Notice: Subject to any disclaimer, the term of this patent is extended or adjusted under 35 U.S.C. 154(b) by 466 days.

(21) Appl. No.: 18/382,848

(22) Filed: Oct. 23, 2023

(65) Prior Publication Data

US 2025/0128372 A1 Apr. 24, 2025

(51) Int. Cl.
*B23Q 3/00* (2006.01)
*B23Q 3/06* (2006.01)
*B23Q 3/08* (2006.01)

(52) U.S. Cl.
CPC ............. *B23Q 3/088* (2013.01); *B23Q 3/062* (2013.01)

(58) Field of Classification Search
CPC . B23Q 3/00; B23Q 3/06; B23Q 3/067; B23Q 3/088; B25B 11/005; B25B 11/00
See application file for complete search history.

(56) References Cited

U.S. PATENT DOCUMENTS

| | | | | |
|---|---|---|---|---|
| 3,652,075 | A * | 3/1972 | Thompson | B25B 11/005 269/21 |
| 6,257,564 | B1 * | 7/2001 | Avneri | H10P 72/7614 269/21 |
| 11,404,302 | B2 * | 8/2022 | Singu | H10P 72/7614 |
| 11,908,726 | B2 * | 2/2024 | Kwon | C22C 38/105 |
| 2006/0231995 | A1 * | 10/2006 | Wang | B25B 11/005 269/21 |
| 2016/0099166 | A1 * | 4/2016 | Yudovsky | H10P 72/7612 269/21 |
| 2018/0215000 | A1 * | 8/2018 | Blick | B25B 11/005 |
| 2019/0143488 | A1 * | 5/2019 | Blick | B23Q 3/088 269/21 |
| 2020/0101584 | A1 * | 4/2020 | Yoshida | B25B 11/005 |
| 2023/0256550 | A1 * | 8/2023 | Murota | B23Q 3/105 269/296 |
| 2025/0128372 | A1 * | 4/2025 | Chang | B23Q 3/088 |

* cited by examiner

*Primary Examiner* — Lee D Wilson
(74) *Attorney, Agent, or Firm* — HDLS IPR SERVICES; Chun-Ming Shih

(57) ABSTRACT

A holder plate for negative pressure chucking, in which the holder plate is plate body comprising a holding surface and a bottom surface. Air passages are formed inside the holder plate and communicates the holding surface and the bottom surface, and the air passages form a plurality of ventilation openings on the holding surface. A total area of an opening of the ventilation openings in the holding surface is less than 50% of the area of the holder plate and greater than 0.2% of the area of the holder plate. The thermal conductivity of the holder plate is greater than 100 W/mK; wherein W is watts, m is meters, and K is the absolute temperature scale.

8 Claims, 11 Drawing Sheets

1
210
212
230
252
250
220
2421
242
240
270
2422
2421
244
4
250
3
222
252
212
260

HOLDER PLATE FOR NEGATIVE PRESSURE CHUCKING, HOLDER DEVICE FOR NEGATIVE PRESSURE CHUCKING, AND DE-BONDING STATION

BACKGROUND

Technical Field

This disclosure relates to a wafer thinning process, and in particular to a holder plate for negative pressure chucking, a holder device for negative, and de-bonding station in a wafer stripping operation.

Related Art

The existing wafer fabrication process is moving towards the trend of thinning, but in the existing wafer thinning process, the gradual thinning of the wafer sheet has insufficient stress strength and is prone to breakage. Before thinning process, the wafer is bonded to a carrier plate, so as to enhance the mechanical strength of the wafer. And then wafer is then subjected to thinning operations such as chemical-mechanical grinding.

After the thinning process, the wafer and the carrier plate are heated, to reduce the strength of the adhesive, and then a carrier plate stripping device is used to strip the carrier plate, and the carrier plate is placed on a cooling platform for cooling and recycling.

In the above-mentioned process, the wafer is also required to be fixed on the holder plate. For wafer fixation, it is necessary to apply force uniformly to the outer surface of the wafer, so as to allow the wafer to be uniformly forced during the process of stripping the carrier plate to avoid warpage or breakage of the wafer.

SUMMARY

In view of the above problem, this disclosure provides a holder plate for negative pressure chucking, a holder device for negative pressure chucking, and a de-bonding station, in which a uniformly distributed negative pressure can be applied to the thin sheet product.

This disclosure provides a holder plate for negative pressure chucking. The holder plate is plate body comprising a holding surface and a bottom surface. Air passages are formed inside the holder plate and communicates the holding surface and the bottom surface, and the air passages form a plurality of ventilation openings on the holding surface. A total area of an opening of the ventilation openings in the holding surface is less than 50% of the area of the holder plate and greater than 0.2% of the area of the holder plate. The thermal conductivity of the holder plate is greater than 100 W/mK; wherein W is watts, m is meters, and K is the absolute temperature scale.

In one or more embodiments, the holder plate is made of a porous medium, and at least partial voids of the porous medium are connected to form the air passage, In one or more embodiments, the porous medium is a sintered material.

In one or more embodiments, the holder plate is made of air impermeable material, and the holder plate further includes a plurality of through holes, wherein the through holes communicate the holding surface and the bottom surface as the air passages, and the through holes form the plurality of ventilation openings on the holding surface.

In one or more embodiments, the holder plate further includes a plurality of trenches, the trenches extend on the holding surface and at least extend to one of the through holes, and the through holes and the trenches form the ventilation openings on the holding surface.

This disclosure further provides a holder device for negative pressure chucking, which includes a holder and the above-mentioned holder plate. The holder is provided with an installation dent on an upper surface of the holder. The holder plate is disposed in the installation dent of the holder in a liftable manner.

In one or more embodiments, the holder device for negative pressure chucking further comprising: a vacuum chuck provided within the installation dent, and the vacuum chuck includes a vacuum adsorption orifice connected to a vacuum pump and air-conducting grooves connected to the vacuum adsorption orifice.

This disclosure further discloses a de-bonding station for stripping a wafer from a carrier plate, and includes a base, a carrier device, a cooling plate, and a carrier plate stripping device. The base is provided with two guiding pieces on two opposite edge sides. The carrier device is disposed on the base and located between the two guiding pieces. The holder device includes a holder and the above-mentioned holder plate. The holder is provided with an installation dent on an upper surface of the holder. The holder plate is disposed in the installation dent of the holder in a liftable manner. and the holding surface is configured to hold the wafer combined with the carrier plate. The cooling plate is disposed on the base and located between the two guiding pieces. The carrier plate stripping device includes a movable seat and a vacuum pickup head. the movable seat is movably coupled to the two guiding pieces; and the vacuum pickup head is movably disposed on the horizontal beam for vacuum adsorbing the carrier plate, so as to strip the carrier plate from the wafer and move the carrier plate to the cooling area of the cooling plate.

In one or more embodiments, each of the two guiding pieces is provided with a guiding slot, the movable seat comprises two pillars and a horizontal beam connecting the two pillars, the two pillars are inserted into each of the guiding slots, such that the movable seat is movably coupled to the two guiding pieces, and the vacuum pickup head is movably disposed on the horizontal beam.

In one or more embodiments, the de-bonding station further includes a first linear actuator and a second linear actuator; wherein the first linear actuator is disposed on the base and connected to one of the two pillars, the first linear actuator is configured to drive the two pillars to move along the two guiding slots; and the vacuum pickup head is connected to the horizontal beam via the second linear actuator, the second linear actuator is configured to drive the vacuum pickup head to move toward or away from the base.

Through the holder plate for negative pressure chucking, the holder device for negative pressure chucking, and the de-bonding station of this disclosure, when fixing thin sheet products such as thinned wafers, it is possible to apply a more uniformly distributed negative pressure adsorption force to the thin sheet product, so as to avoid forces on the thin sheet from being applied on small areas. This disclosure can effectively avoid the problems of warpage and breakage of the thin sheet product during the manufacturing process, such as when the wafer is stripped off from the carrier plate.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
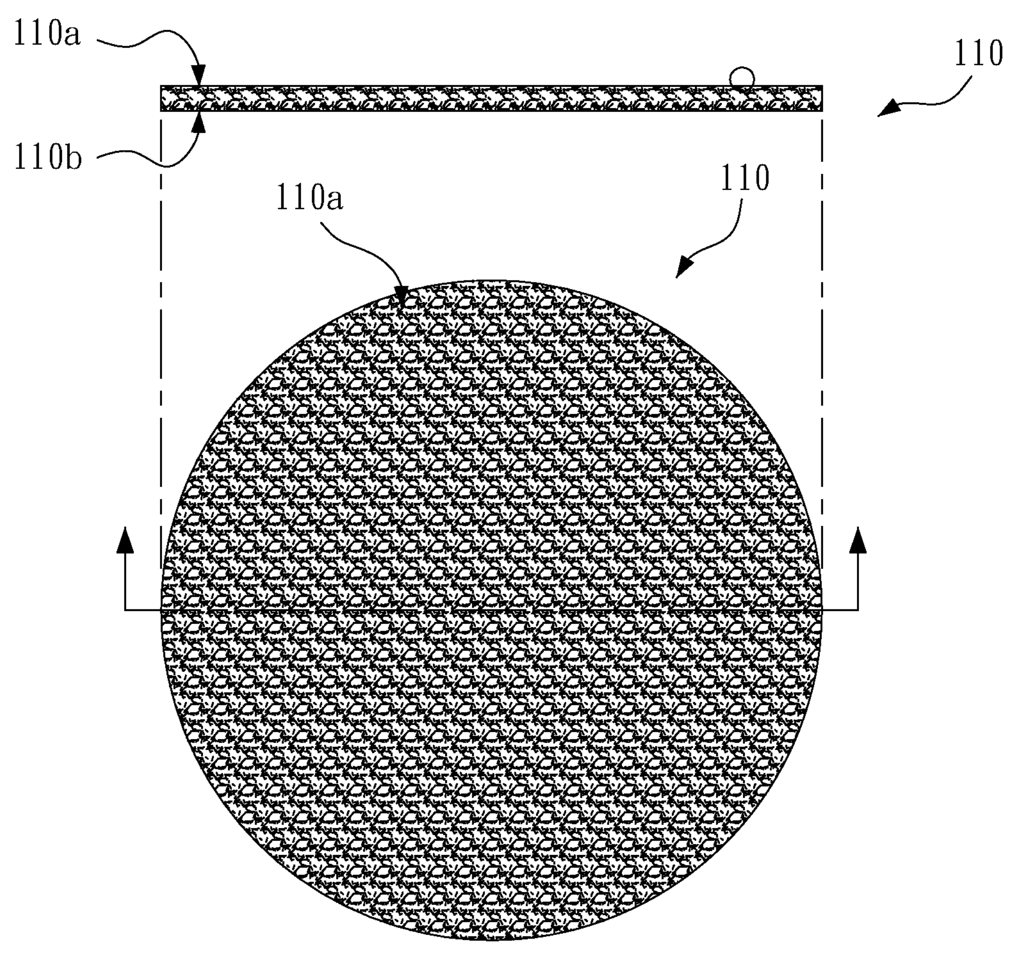
FIG. 1 shows a cross-sectional view and a top view according to an example 1 of a holder plate for negative pressure chucking of an embodiment of this disclosure.
Figure 7:
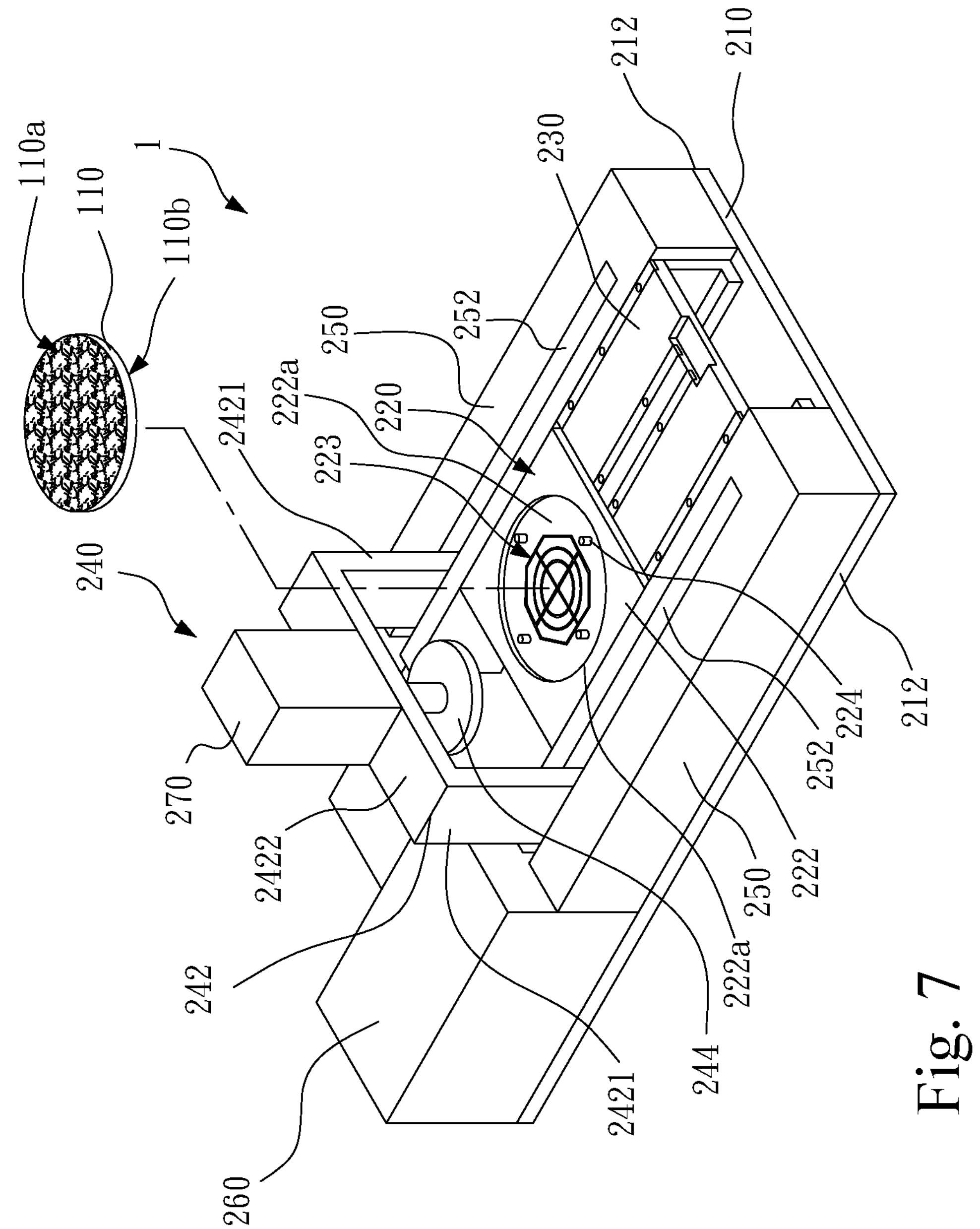
FIG. 7 is a perspective view of the de-bonding station showing the holder plate separated.

Referring to FIG. 1 and FIG. 7, showing a holder plate for negative pressure chucking disposed on a de-bonding station according to an embodiment of this disclosure.

Figure 3:
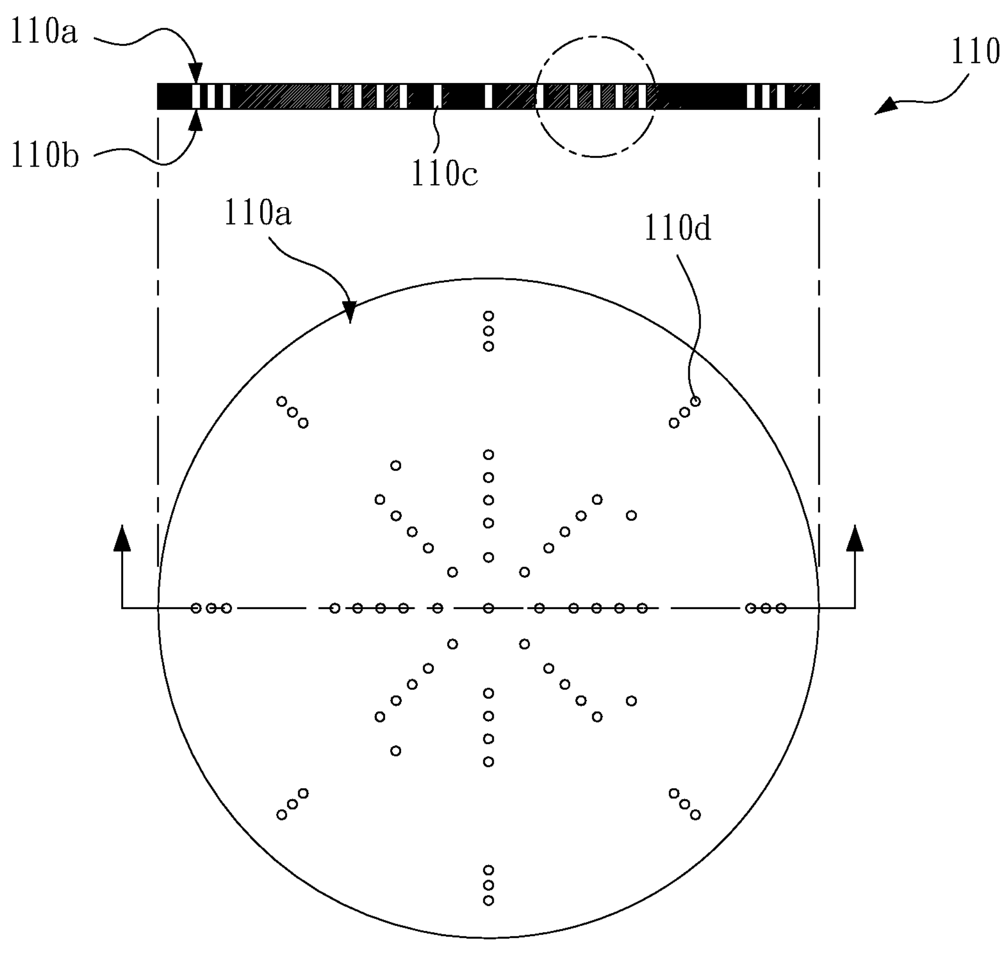
FIG. 3 shows a cross-sectional view and a top view according to an example 2 of a holder plate for negative pressure chucking of the embodiment of this disclosure.
Figure 4:
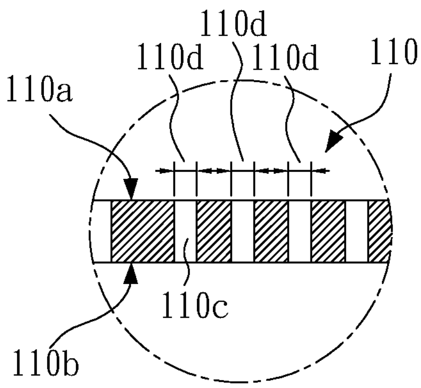
FIG. 4 is a partially enlarged view of FIG. 3.
Figures 5, 6:
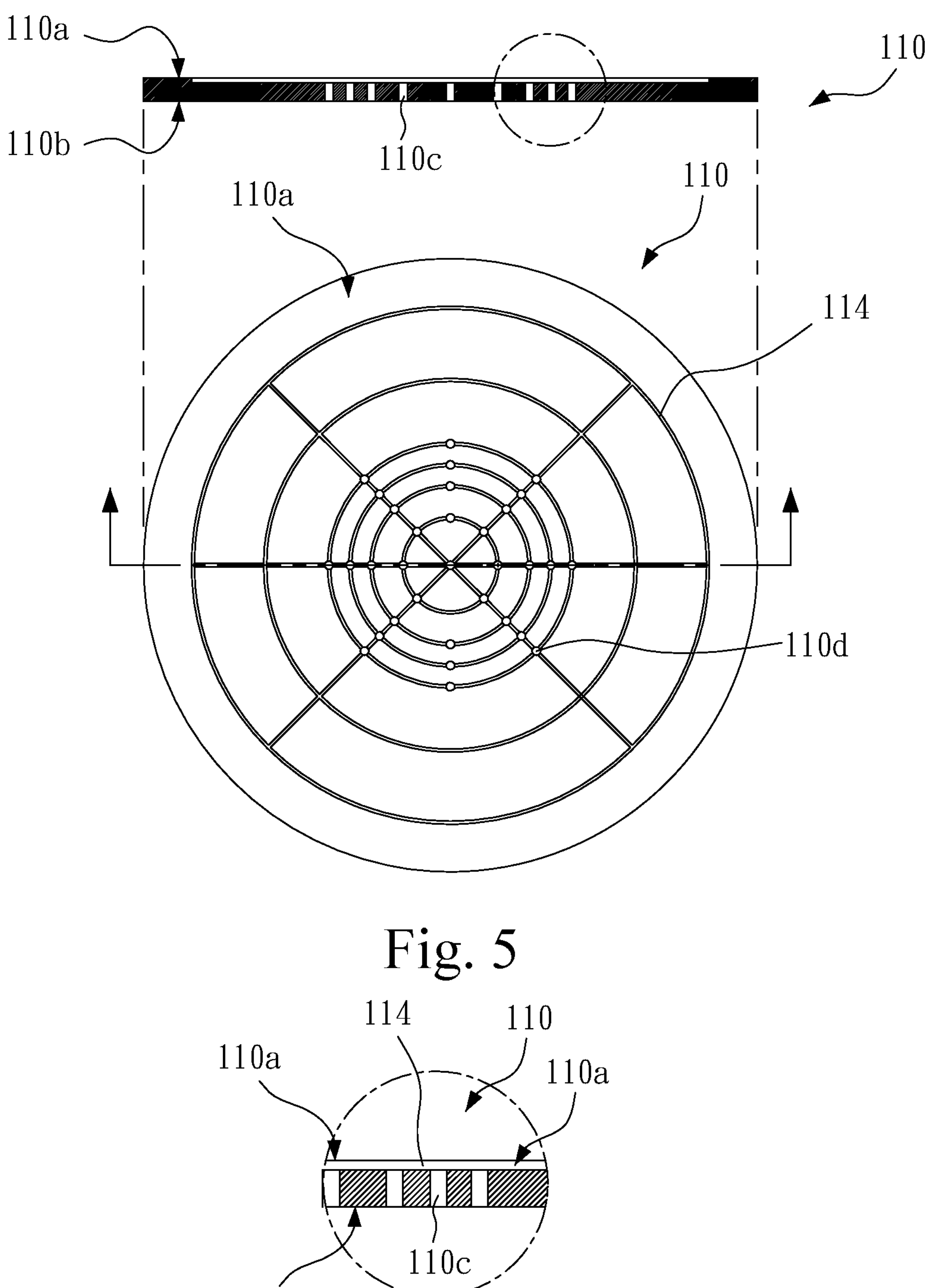
FIG. 5 shows a cross-sectional view and a top view according to an example 3 of a holder plate for negative pressure chucking of the embodiment of this disclosure.
FIG. 6 is a partially enlarged view of FIG. 5.

FIG. 1 to FIG. 6 respectively show an example 1 (FIG. 1 and FIG. 2), an example 2 (FIG. 3, FIG. 4, and FIG. 7), and an example 3 (FIG. 5 and FIG. 6). The holder plate is plate body including a holding surface 110*a* and a bottom surface 110*b*. The holder plate 110 is configured for a thin sheet product to be placed thereon. The thin sheet product may be, but not limited to, a thinned wafer (a wafer 3 bonded to a carrier plate 4) or other semi-finished/finished product of the wafer.

Referring to FIG. 1 and FIG. 7, Air passages 110*c* are formed inside the holder plate 110 and communicates the holding surface 110*a* and the bottom surface 110*b*. The air passages 110*c* form a plurality of ventilation openings 110*a* on the holding surface 110*a*. The thermal conductivity (k) of the holder plate 110 is greater than 100 W/mK (k>100 Wm/K) The aforementioned physical units include: W as watts, m as meters, and K as absolute temperature scale. Specifically, the holder plate 110 is connected to a heating device 120. The heating device 120 may be, but not limited to, an electric heating wire or a ceramic heating tube. The heating device 120 is fixed to the bottom surface 110*b* or is connected to the bottom surface 110*b* of the holder plate 110 through a heat conducting element (e.g., metal rod, metal block). The heating device 120 is configured to rapidly heat the holder plate 110. A large thermal conductivity k of k>100 W/mK helps to raise the temperature of the holder plate 110 rapidly, so as to accelerate the process of stripping the carrier plate 4. The large thermal conductivity also makes the temperature distribution on the holder plate 110 more uniform, avoiding the problem of uneven heating and rupture of the thinned wafers due to excessive temperature gradients on the holder plate 110.

In addition, the total area (C) of the ventilation openings 110*d* on the holding surface 110*a* is smaller than 50% of the area of the holding surface 110*a* of the holder plate 110, and larger than 0.2% of the area of the holding surface 110*a* of the holder plate 110; that is the opening area ration (OA) is: 50%>OA>0.2%. The aforementioned ventilation openings 110*d* refer to the aperture and recessed portions formed by air passage 110*c* on the holding surface 110*a*, the ventilation openings 110*d* include trenches, and recessed portions extending horizontally on the holding surface 110*a*, and are not limited apertures communicating the holding surface 110*a* and the bottom surface 110*b* of the holder plate 110.

Figure 2:
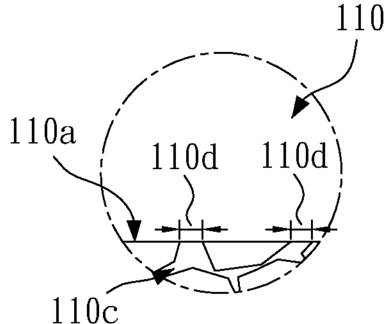
FIG. 2 is a partially enlarged view of FIG. 1.

As shown in FIG. 1 and FIG. 2, the holder plate 110 is example 1 is made of porous medium, and at least partial voids of the porous medium are connected to form the air passage, so as to allow for airflow between the carrier surface 110*a* and the bottom surface 110*b*. the porous medium is a sintered material such as sintered SiC (silicon carbide). By heating the powder of the sintered material at a high temperature, the powder is combined to form the holder plate 110. Compared with ordinary ceramic materials, SiC has higher thermal conductivity and oxidation resistance. The sintered material does not exclude metal, i.e., the holder plate 110 may be made by powder metallurgy. It should be noted that the opening area ration (OA) being 50%>OA>0.2% refers to the opening area ration of the holding surface 110*a*, i.e., the proportion of the portion of the holding surface 110*a* that does not form a flat surface, and OA does not intend to mean the overall porosity of the porous media.

As shown in FIG. 3 and FIG. 4, the holder plate 110 in example 2 is made of air impermeable material such as metal. The holder plate 110 in example 2 further includes a plurality of through holes, and the through holes communicate the holding surface 110*a* and the bottom surface 110*b* as the air passages 110*c*. And these through holes are air passages 110*c* in example 2, and these through holes form the ventilation openings 110*a* on the holding surface 110*a*.

As shown in FIG. 5 and FIG. 6, the holder plate 110 in example 3 is made of air impermeable material such as metal. the holder plate 110 further includes a plurality of through holes and a plurality of trenches 114, and the through holes communicate the holding surface 110*a* and the bottom surface 110*b* as the air passages 110*c*. The trenches 114 extend on the holding surface 110*a* and at least extend to one of the through holes. The through holes and the trenches 114 form the ventilation openings 110*d* on the holding surface 110*a*.

Figure 8:
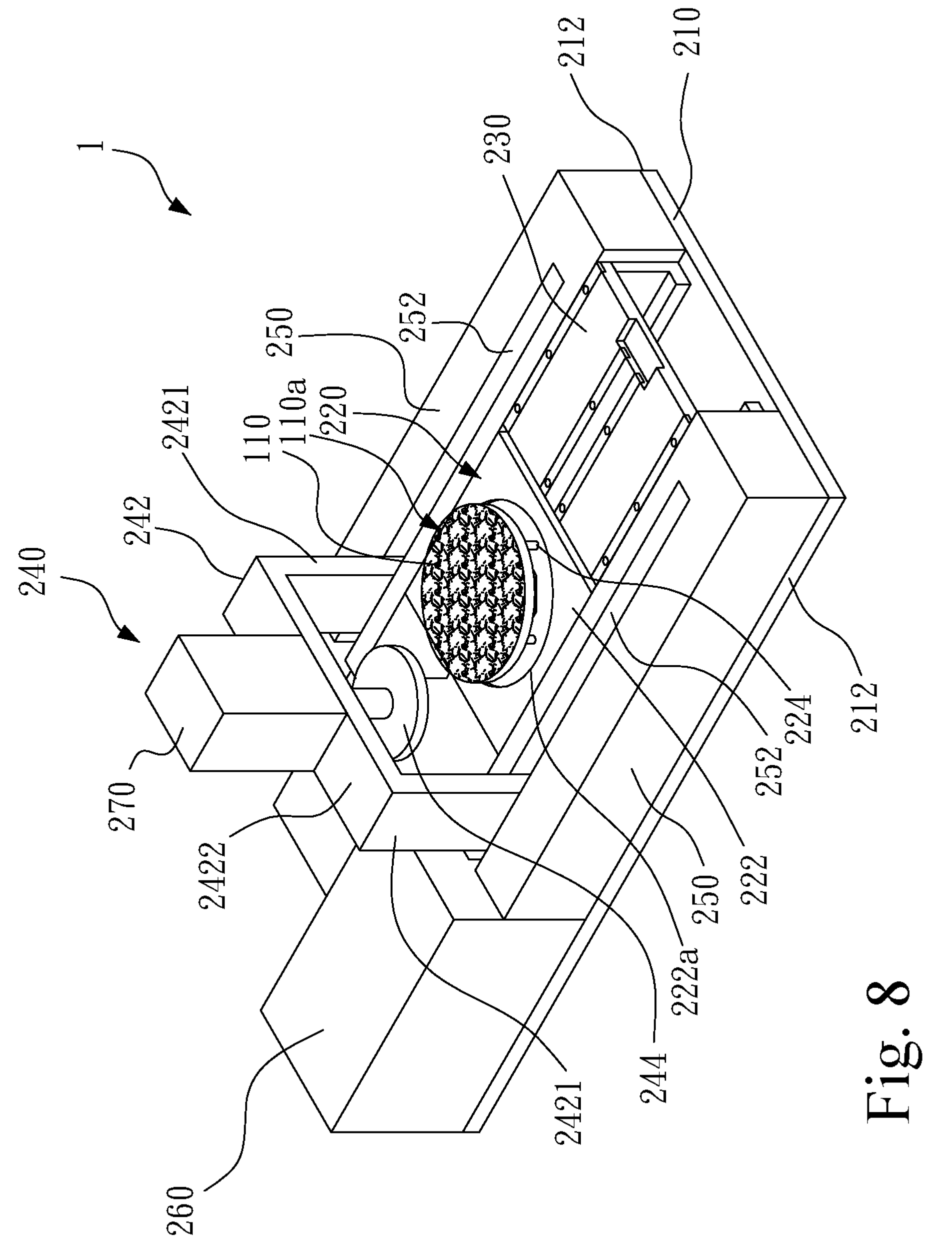
FIG. 8 is a perspective view of the de-bonding station.
Figures 9, 10:
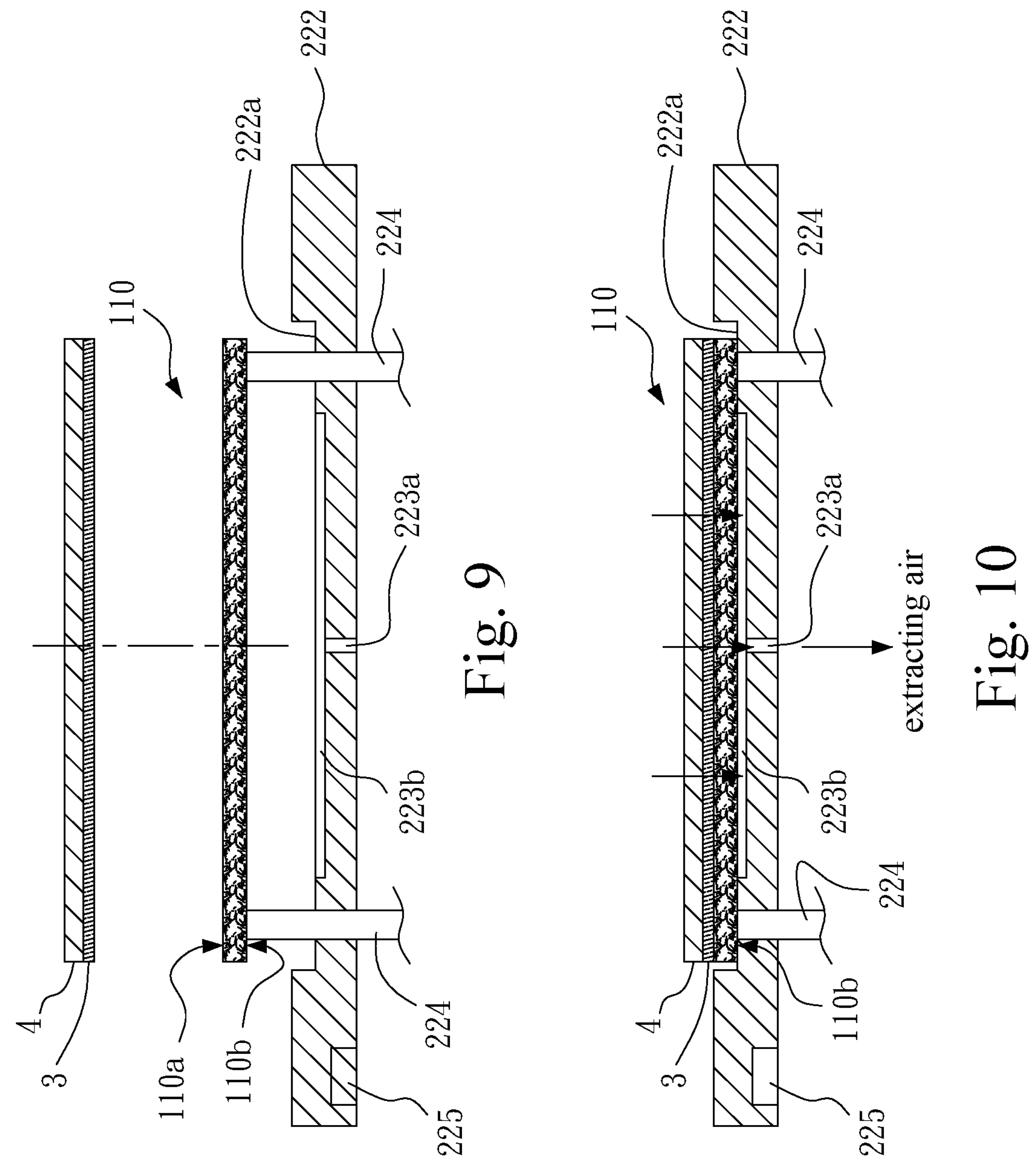
FIG. 9 and FIG. 10 show cross-sectional views of the holder plate, a wafer to be stripped from a carrier plate.

Please refer FIG. 7, FIG. 8, and FIG. 9, based on the above-described holder plate 110 for thinned wafers, this disclosure proposes a de-bonding station 1 for thinned wafers. the de-bonding station 1 includes a base 210, a holder device 220, the cooling plate 230, and a carrier plate stripping device 240.

As shown in FIG. 7 and FIG. 8, the base 210 is provided with two guiding pieces 250 on two opposite edge sides 212. Each of the two guiding pieces 250 is provided with a guiding slot 252. The holder device 220 is disposed on the base 210 and located between the two guiding pieces 250.

As shown in FIG. 7 and FIG. 8, The holder device 220 includes a holder 222, a vacuum chuck 223, the above-mentioned holder plate 110 for thinned wafer, and a plurality of lifting pins 224. The holder plate 110 is configured for placing the wafer 3 to be stripped and its carrier plate 4 thereon.

As shown in FIG. 7, FIG. 9, and FIG. 10, The holder 222 is provided with an installation dent 222*a* on an upper surface of the holder 222, The installation dent 222*a* is configured for the holder plate 110 to be disposed thereon in a liftable manner. The installation dent 222*a* is a shallow concave. The bottom surface 110*b* of the holder plate 110 faces the installation dent 222*a*, and the depth of the installation dent 222*a* is substantially the same as the thickness of the holder plate 110. In at least one embodiment, the upper surface of the holder 222 is not provided with the installation dent 222*a*, and the holder plate 110 is directly and disposed on the upper surface of the holder 222 in a liftable manner. A heater 225, such as an electric heat pipe, may also be disposed to the holder 222 for heating the holder plate 110, so as to indirectly heating the wafer 3 and the carrier plate 4 placed on the holder plate 110.

As shown in FIG. 7, FIG. 9 and FIG. 10, the vacuum chuck 223 and the lifting pins 224 are disposed within the installation dent 222*a*. The vacuum chuck 223 may include a vacuum adsorption orifice 223*a* connected to a vacuum pump and air-conducting grooves 223*b* connected to the vacuum adsorption orifice 223*a*.

As shown in FIG. 7, FIG. 9 and FIG. 10, the lifting pins 224 are disposed within the installation dent 222*a*. The bottom surface 110*b* of the holder 110 is directly or indirectly connected to the lifting pins 224, and the holding surface 110*a* faces upward. The lifting pins 224 are disposed on the holder 222 in a rising and lowering manner, so as to rise upward or lower down with respect to the holder 222, so as to lift or lower down the holder 110. That is, in this embodiment, the holder plate 110 is disposed in the installation dent 222*a* in a liftable manner.

As shown in FIG. 10, When the lifting pins 224 lower down with respect to the holder 222, the holder plate 110 is lower to the installation dent 222*a* with the bottom surface 110*b* contacting the installation dent 222*a*. the vacuum pump extracts air from the vacuum adsorption orifice 223*a*, The vacuum adsorption orifice 223*a* and the air-conducting grooves 223*b* connected to the vacuum adsorption orifice 223*a* generate a negative pressure to attract air flow through the holder plate 110, so as to generate negative pressure on the holding surface 110*a* of the holder plate 110 to absorb and fix the wafer 3 and the carrier plate 4 placed on the holder plate 110. At the moment, the heater 225 heats the holder 222 so that the wafer 3 and the carrier plate 4 are indirectly heated through the holder plate 110.

As shown in FIG. 7 and FIG. 8, the cooling plate 230 is disposed on the base 210 and located between the two guiding pieces 250. The cooling plate 230 is adjacent to the holder device 220 for the carrier plate 4 to be placed thereon and cooled.

As shown in FIG. 7 and FIG. 8, The carrier plate stripping device 240 includes a movable seat 242 and a vacuum pickup head 244. The movable seat 242 includes two pillars 2421 and a horizontal beam 2322 connecting the two pillars 2421. The two pillars 2421 are inserted into each of the guiding slots 252, such that the movable seat 242 is movably coupled to the two guiding pieces 250, and the movable seat 242 is able to move in a longitudinal direction relative to the base 210. In addition, the de-bonding station 1 includes first linear actuator disposed on the base 260 and connected to the movable seat 242, particularly connected to one of the two pillars 2421.

As shown in FIG. 7 and FIG. 8, the vacuum pickup head 244 is movably disposed on horizontal beam 2422 of the movable seat 242, and the vacuum pickup head 244 is connected to the horizontal beam 2422 via a second linear actuator 270. The vacuum pickup head 244 is configured for vacuum adsorbing the carrier plate 4, the second linear drive 270 is configured to drive the vacuum pickup head 244 toward (down) the base 210 or away (up) from the base 210. Meanwhile, through the first linear actuator 260 driving the two pillars 2421 to move along the guiding slots 252, the vacuum pickup head 244 is driven to move along the longitudinal direction.

Please refer to FIG. 8 to FIG. 15, which show the de-bonding process of the carrier plate 4. An adhesive is provided on the surface of the carrier plate 4, and the wafer 3 is first temporarily adhered (bonded) to the carrier plate 4. The carrier plate 4 may be, but is not limited to, a glass substrate. The carrier plate 4 is used to reinforce the mechanical strength of the wafer 3 by the backside of the wafer 3. The wafer 3 and the carrier plate 4 are then placed in a thinning device to grind the surface of the wafer 3 by means of chemical-mechanical grinding, etc., to reduce the thickness of the wafer 3 and to flatten the surface of the wafer 3. The carrier plate 4 increases mechanical strength and prevents warpage of the wafer 3 during the thinning process.

As shown in FIG. 7 and FIG. 8, the lifting pins 224 of the holder device 220 first rise to lift the holder plate 110, and the wafer 3 to be stripped and its carrier plate 4 are moved by a robotic arm or other transportation equipment and placed on the holder plate 110. And the wafer 3 faces the holding surface 110*a* of the holder plate 110.

Figure 11:
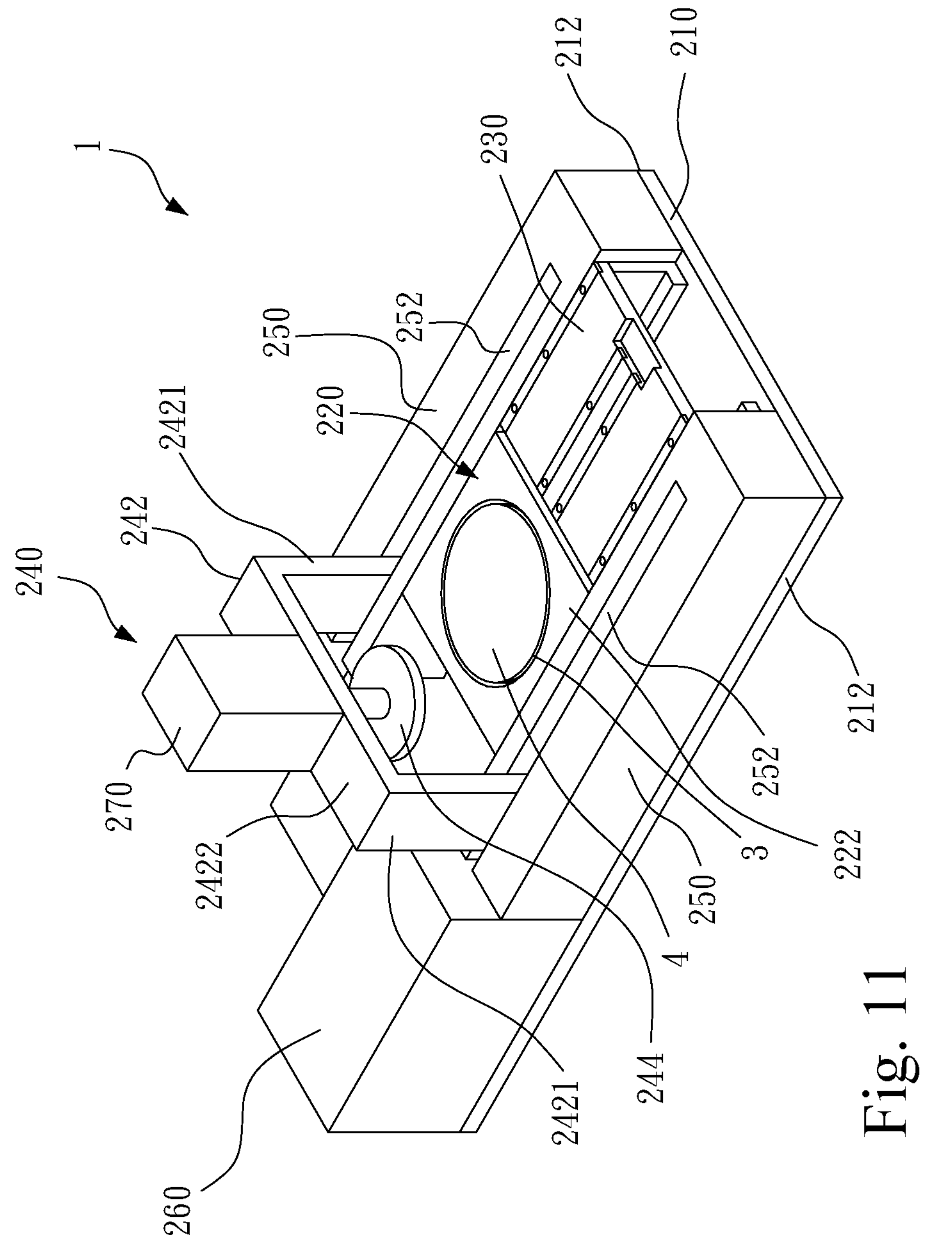
FIG. 11 to FIG. 15 are perspective views of the de-bonding station according to the embodiment of this disclosure, showing the stripping process of the carrier plate.

As shown in FIG. 10 and FIG. 11, next, the lifting pins 224 lower down so that the holding surface 110*a* of the holder plate 110 is approximately flush with the holder 222. as shown in FIG. 10, the vacuum pump extracts air from the vacuum adsorption orifice 223*a*, and generates negative pressure absorption force at the ventilation openings 110*d* to absorb and fix the wafer 3. Meanwhile, the holder 222 indirectly heats the wafer 3 and carrier plate 4 via the holder plate 110 weaken adhesive/bonding structure, for example, softening of adhesive between the wafer 3 and the carrier plate 4.

Figure 12:
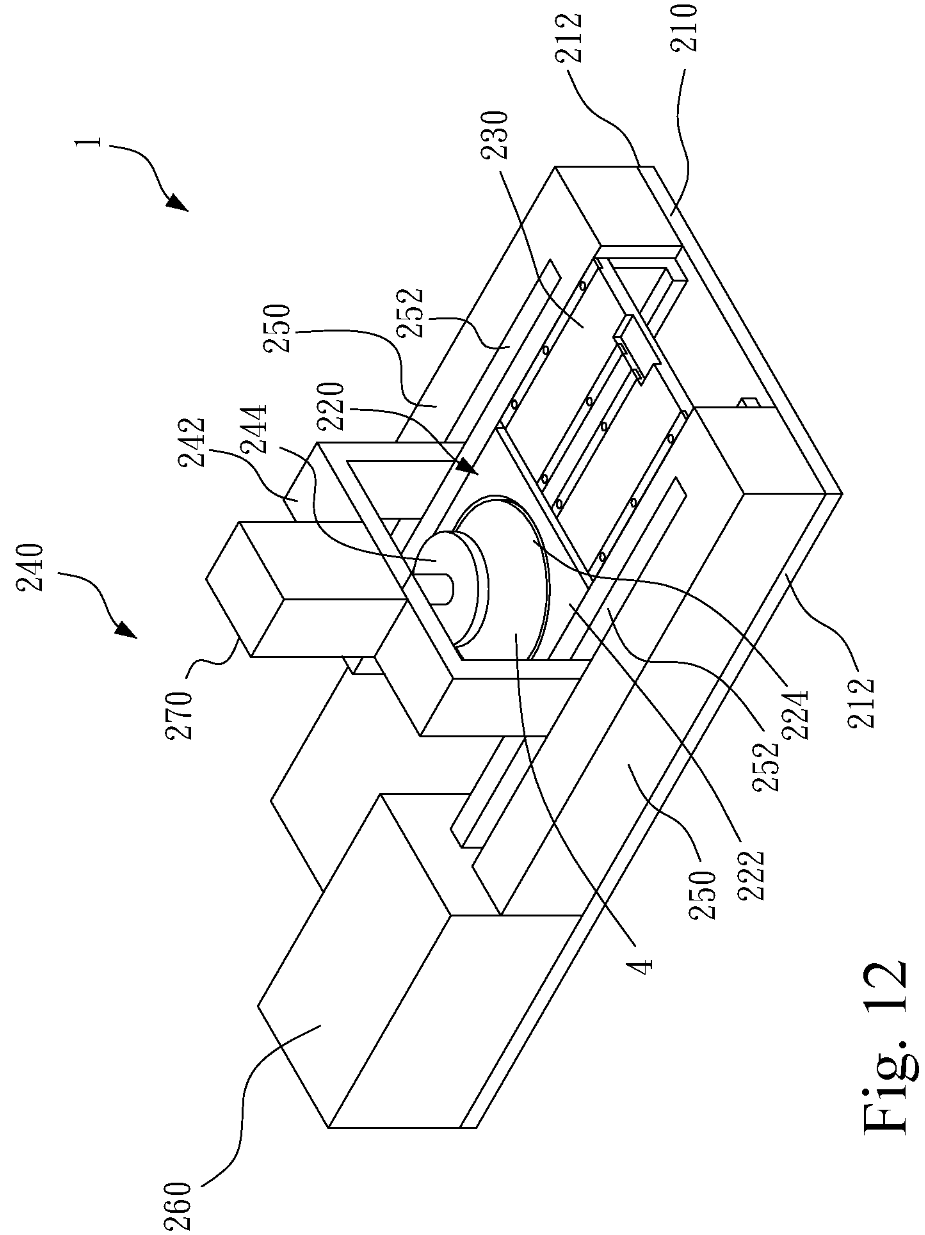
Figure 13:
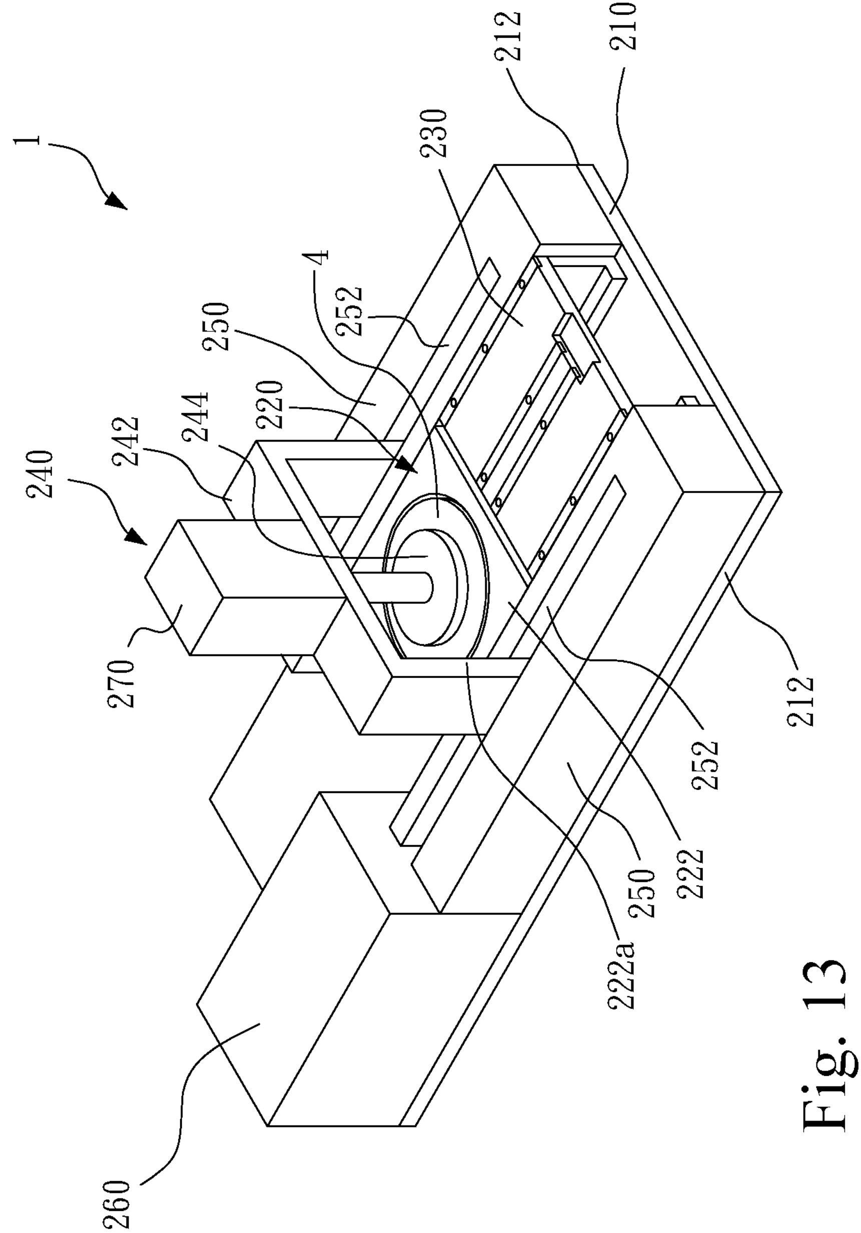

As shown in FIG. 12 and FIG. 13, the second linear actuator 270 drives the vacuum pickup head 234 to lower down to contact the carrier plate 4, and the vacuum pickup head vacuum adsorbs the carrier plate 4. The second linear actuator 270 drives the vacuum pickup head 244 to rise to strip the carrier plate 4 from the wafer 3.

Figure 14:
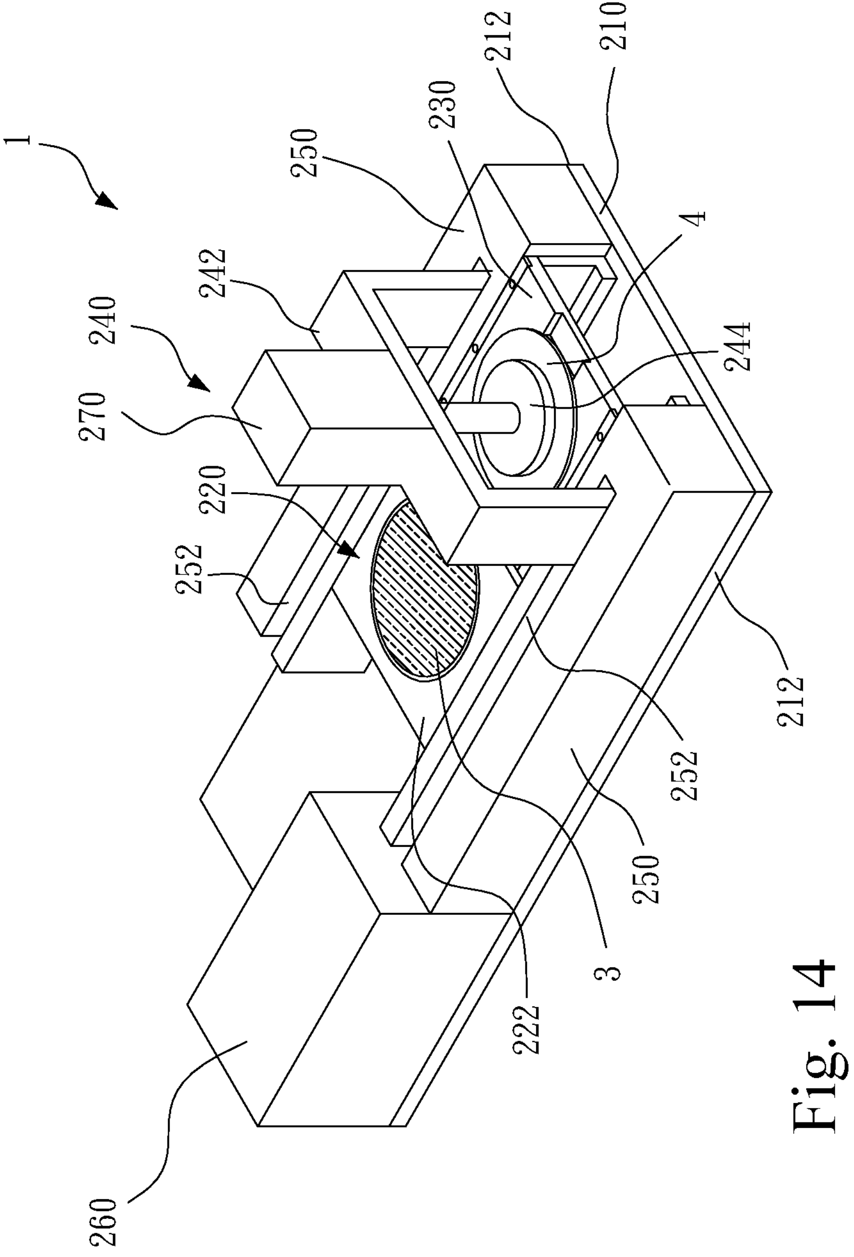
Figure 15:
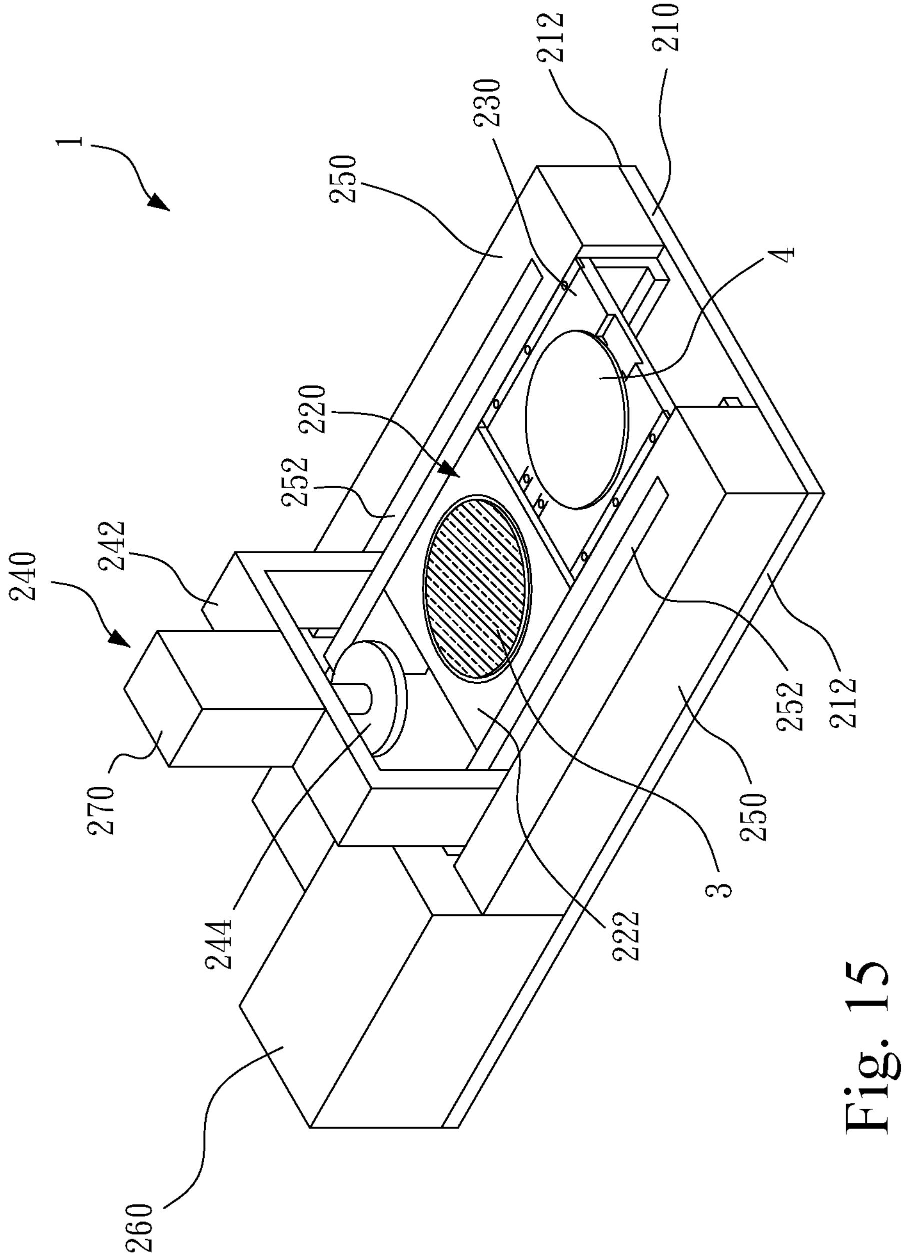

As shown in FIG. 14 and FIG. 15, the first linear actuator 260 drives the two pillars 2421 to move along the guiding slots 252, to move the vacuum pickup head 244 and the carrier plate 4 to the cooling plate 230, and place the carrier plate 4 on the cooling plate 230. Meanwhile, By means of a cooling device located inside or outside the cooling plate 230, For example, a liquid cooling device that liquid cools the cooling plate 230 or an air cooling device that provides a cooling airflow to the cooling plate 230 to cool the carrier plate 4 directly.

The cooled carrier plate 4 can be picked up by a robotic arm or other pickup device and moved to a transfer tray. Similarly, the wafer 3 on the holder plate 110 can be picked up by a robotic arm or other pickup device and moved to other transfer tray.

As described above, the ventilation openings 110*d* are uniformly disposed on the holding surface 110*a*, which can uniformly adsorb the wafer 3, so that the wafer 3 is uniformly subjected to the absorbing force and will not be warped or broken when the carrier plate 4 is stripped off. The total area (C) of the ventilation openings 110*d* on the holding surface 110*a* is smaller than 50% of the area of the holding surface 110*a* of the holder plate 110, and larger than 0.2% of the area of the holding surface 110*a* of the holder plate 110; Therefore, sufficient and uniform adsorption force can be applied on the wafer 3.

Through the holder plate 110 for negative pressure chucking, the holder device 220 for negative pressure chucking, and the de-bonding station 1 of this disclosure, when fixing thin sheet products such as thinned wafers, it is possible to apply a more uniformly distributed negative pressure adsorption force to the thin sheet product, so as to avoid forces on the thin sheet from being applied on small areas.

this disclosure can effectively avoid the problems of warpage and breakage of the thin sheet product during the manufacturing process, such as when the wafer 3 is stripped off from the carrier plate 4.

What is claimed is:

1. A holder plate for negative pressure chucking, in which the holder plate is plate body comprising a holding surface and a bottom surface, and wherein:

the holder plate is made of a porous medium;

air passages are formed inside the holder plate by interconnecting at least partial voids of the porous medium and communicates the holding surface and the bottom surface, and the air passages form a plurality of ventilation openings on the holding surface;

wherein a total area of an opening of the ventilation openings in the holding surface is less than 50% of the area of the holder plate and greater than 0.2% of the area of the holder plate; and the thermal conductivity of the holder plate is greater than 100 W/mK; wherein W is watts, m is meters, and K is the absolute temperature scale.

2. The holder plate for negative pressure chucking as claimed in claim 1, wherein, the porous medium is a sintered material.

3. A holder plate for negative pressure chucking, in which the holder plate is plate body comprising a holding surface and a bottom surface, and wherein:

the holder plate is made of air impermeable material, and the holder plate further includes a plurality of through holes and a plurality of tranches, the trenches extend on the holding surface and at least extend to one of the through holes, wherein the through holes and the trenches form the ventilation openings on the holding surface;

air passages are formed inside the holder plate and communicates the holding surface and the bottom surface, and the air passages form a plurality of ventilation openings on the holding surface, wherein the through holes communicate the holding surface and the bottom surface as the air passages, and the through holes form the plurality of ventilation openings on the holding surface;

wherein a total area of an opening of the ventilation openings in the holding surface is less than 50% of the area of the holder plate and greater than 0.2% of the area of the holder plate; and the thermal conductivity of the holder plate is greater than 100 W/mK; wherein W is watts, m is meters, and K is the absolute temperature scale.

4. A holder device for negative pressure chucking, comprising:

a holder, provided with an installation dent on an upper surface of the holder; and the holder plate according to claim 1, disposed in the installation dent of the holder in a liftable manner.

5. The holder device for negative pressure chucking as claimed in claim 4, further comprising: a vacuum chuck, provided within the installation dent; wherein the vacuum chuck includes a vacuum adsorption orifice connected to a vacuum pump and air-conducting grooves connected to the vacuum adsorption orifice.

6. A de-bonding station, for stripping a wafer from a carrier plate, comprising:

a base with two guiding pieces on two opposite edge sides;

a holder device disposed on the base and located between the two guiding pieces; wherein the holder device comprises:

a holder, provided with an installation dent on an upper surface of the holder; and the holder plate according to claim 1, disposed in the installation dent of the holder in a liftable manner, and the holding surface is configured to hold the wafer combined with the carrier plate, a cooling plate, disposed on the base, and located between the two guiding pieces;

a carrier plate stripping device comprising a movable seat and a vacuum pickup head; wherein the movable seat is movably coupled to the two guiding pieces; the vacuum pickup head is movably disposed on the movable seat for vacuum adsorbing the carrier plate, so as to strip the carrier plate from the wafer and move the carrier plate to the cooling plate.

7. The de-bonding station as claimed in claim 6, wherein each of the two guiding pieces is provided with a guiding slot, the movable seat comprises two pillars and a horizontal beam connecting the two pillars, and the two pillars are inserted into each of the guiding slots, such that the movable seat is movably coupled to the two guiding pieces, and the vacuum pickup head is movably disposed on the horizontal beam.

8. The de-bonding station as claimed in claim 7, further comprising: a first linear actuator and a second linear actuator; wherein the first linear actuator is disposed on the base and connected to one of the two pillars, the first linear actuator is configured to drive the two pillars to move along the two guiding slots; and the vacuum pickup head is connected to the horizontal beam via the second linear actuator, the second linear actuator is configured to drive the pickup head to move toward or away from the base.

* * * * *